United States Patent
Griffith et al.

(10) Patent No.: US 9,868,522 B2
(45) Date of Patent: Jan. 16, 2018

(54) ROTORCRAFT AUTOPILOT CONTROL

(71) Applicant: Bell Helicopter Textron Inc., Fort Worth, TX (US)

(72) Inventors: Carl D. Griffith, Colleyville, TX (US); Brady G. Atkins, Irving, TX (US); Awais Raza, Fort Worth, TX (US); Paul M. Wilson, Argyle, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 734 days.

(21) Appl. No.: 14/465,334

(22) Filed: Aug. 21, 2014

(65) Prior Publication Data
US 2016/0052628 A1    Feb. 25, 2016

(51) Int. Cl.
| | | |
|---|---|---|
| *B64C 27/57* | (2006.01) | |
| *B64C 27/04* | (2006.01) | |
| *B64C 13/08* | (2006.01) | |
| *B64C 13/18* | (2006.01) | |
| *B64C 13/30* | (2006.01) | |
| *B64C 27/56* | (2006.01) | |
| *B64C 27/58* | (2006.01) | |

(52) U.S. Cl.
CPC .............. *B64C 27/57* (2013.01); *B64C 13/08* (2013.01); *B64C 13/18* (2013.01); *B64C 13/30* (2013.01); *B64C 27/04* (2013.01); *B64C 27/56* (2013.01); *B64C 27/58* (2013.01)

(58) Field of Classification Search
CPC ......... B64C 13/10; B64C 13/30; B64C 13/46; B64C 13/08; B64C 13/18; B64C 27/56; B64C 27/68; B64C 27/57; B64C 27/58; B64C 27/59; B64C 27/04
See application file for complete search history.

(56) References Cited

U.S. PATENT DOCUMENTS

| | | | | |
|---|---|---|---|---|
| 4,109,886 A | * | 8/1978 | Tribken | ............... G05D 1/0833 244/17.13 |
| 4,345,195 A | * | 8/1982 | Griffith | .................. B64C 13/46 244/223 |

(Continued)

FOREIGN PATENT DOCUMENTS

| | | |
|---|---|---|
| DE | 202008015384 | 1/2009 |
| EP | 451218 | 10/1991 |

(Continued)

OTHER PUBLICATIONS

European Search Report issued in European Application No. 15181829.1 on Dec. 8, 2015; 3 pages.

(Continued)

*Primary Examiner* — Justin Rephann (57) ABSTRACT

A rotorcraft autopilot system includes a series actuator connecting a cockpit control component to a swashplate of a rotorcraft, the series actuator to modify a control input from the cockpit control component to the swashplate through a downstream control component. The rotorcraft autopilot system also includes a differential friction system connected to the cockpit control component, the differential friction system to control the series actuator to automatically adjust a position of the cockpit control component during rotorcraft flight based, in part, on a flight mode of the rotorcraft.

18 Claims, 5 Drawing Sheets

(56) References Cited

U.S. PATENT DOCUMENTS

| | | | | |
|---|---|---|---|---|
| 4,426,607 A * | 1/1984 | Black | B64C 13/38 | 244/223 |
| 5,184,054 A * | 2/1993 | Delattre | B64C 13/08 | 318/12 |
| 5,190,243 A * | 3/1993 | Guimbal | B64C 13/28 | 244/17.25 |
| 7,108,232 B2 * | 9/2006 | Hoh | B64C 13/04 | 244/223 |
| 8,548,651 B2 * | 10/2013 | Antraygue | B63H 21/213 | 701/4 |
| 2003/0094539 A1 * | 5/2003 | Schaeffer | B64C 13/10 | 244/17.13 |
| 2005/0173595 A1 | 8/2005 | Hoh | | |
| 2006/0070827 A1 * | 4/2006 | Sandells | B64C 13/28 | 188/72.7 |
| 2008/0065278 A1 * | 3/2008 | Shultz | B64C 13/24 | 701/3 |
| 2008/0116317 A1 * | 5/2008 | Steinberg | B64C 13/30 | 244/99.3 |
| 2008/0179463 A1 * | 7/2008 | Le Bastard | B64C 27/57 | 244/194 |
| 2009/0234518 A1 * | 9/2009 | Irwin, III | B64C 13/10 | 701/4 |
| 2009/0266940 A1 * | 10/2009 | Miller | B64C 13/10 | 244/223 |
| 2010/0123045 A1 * | 5/2010 | Grieser | B63H 25/10 | 244/178 |
| 2011/0031346 A1 * | 2/2011 | Allieta | B64C 27/56 | 244/17.13 |
| 2011/0276202 A1 * | 11/2011 | Carlavan | B64C 13/10 | 701/11 |
| 2012/0072056 A1 * | 3/2012 | Hasan | B64C 13/00 | 701/3 |
| 2012/0241563 A1 * | 9/2012 | Chaduc | B64C 13/30 | 244/196 |
| 2013/0175385 A1 * | 7/2013 | Eglin | G05D 1/0858 | 244/17.13 |
| 2013/0221153 A1 * | 8/2013 | Worsham, II | B64C 27/006 | 244/17.13 |
| 2014/0027564 A1 * | 1/2014 | Mercer | B64C 27/56 | 244/17.13 |
| 2014/0027565 A1 * | 1/2014 | Marvin | B64C 27/57 | 244/17.13 |
| 2014/0027566 A1 * | 1/2014 | Mercer | B64C 27/68 | 244/17.13 |
| 2015/0344128 A1 * | 12/2015 | Sandri | B64C 13/18 | 244/223 |

FOREIGN PATENT DOCUMENTS

| | | |
|---|---|---|
| EP | 2266878 | 12/2010 |
| EP | 2384969 | 11/2011 |
| WO | 2006/137908 | 12/2006 |

OTHER PUBLICATIONS

Communication Pursuant to Article 94(3) EPC issued in European Application No. 15181829.1 on Jan. 15, 2016; 7 pages.

* cited by examiner

ROTORCRAFT AUTOPILOT CONTROL

TECHNICAL FIELD

This disclosure relates to rotorcraft autopilot systems for controlling rotorcraft flight.

BACKGROUND

Autopilot systems in aircrafts and rotorcrafts perform trimming operations between cockpit controls and flight components (e.g., rotorcraft swashplates, aircraft propellers, and/or others). Some aircraft and rotorcraft flight control systems use a combination of series actuators and parallel actuators to provide both hands-on stabilization and hands-off flight control, respectively. For example, series actuators often supply changes to the control surfaces (e.g., swashplate) of a rotorcraft without moving cockpit controls, and parallel actuators often position the cockpit controls to satisfy a trimming operation of the aircraft or rotorcraft.

SUMMARY

This disclosure describes control of an aircraft flight with an autopilot system, for example, including a differential friction system.

Certain aspects encompass a rotorcraft autopilot system including a series actuator connecting a cockpit control component to a swashplate of a rotorcraft, and including a differential friction system connected to the cockpit control component. The series actuator modifies a control input from the cockpit control component to the swashplate through a downstream control component. The differential friction system controls the series actuator to automatically adjust a position of the cockpit control component during rotorcraft flight based, in part, on a flight mode of the rotorcraft.

The aspects above can include some, none, or all of the following features. The series actuator modifies the control input by adjusting a movement between an upstream control component connected to the cockpit control component and the downstream control component to move the swashplate in response to the control input from the cockpit control component. The upstream control component and the downstream control component include an upstream control linkage and a downstream control linkage, respectively. The differential friction system includes a clutch brake grounded to the rotorcraft proximate the upstream control component, the clutch brake to engage or disengage the upstream control component. The clutch brake is a magnetic clutch brake. The differential friction system includes a variable friction device grounded to the rotorcraft proximate the downstream control component, the variable friction device to increase or decrease friction on the downstream control component. When the clutch brake is disengaged, a fixed friction of the downstream control component substantially prevents the downstream control component from movement. The rotorcraft autopilot system includes a centering spring on the upstream control component between the clutch brake and the cockpit control component, the centering spring to bias the cockpit control component toward a neutral center position when the clutch brake is engaged.

Certain aspects encompass a method including determining a flight mode of a rotorcraft, identifying a swashplate position of the rotorcraft corresponding to the determined flight mode, and adjusting a cockpit control position of a rotorcraft cockpit control component based on a differential friction across a series actuator connecting the cockpit control component to the swashplate, the adjusted cockpit control position to match the identified swashplate position.

The aspects above can include some, none, or all of the following features. Adjusting a cockpit control position of a rotorcraft cockpit control component based on differential friction across a series actuator connecting the cockpit control component to the swashplate includes adjusting the differential friction across the series actuator to cause the series actuator to adjust the cockpit control component or the swashplate. Adjusting the differential friction across the series actuator to cause the series actuator to adjust the cockpit control component includes disengaging a clutch brake on an upstream control component connecting the cockpit control component to the series actuator to allow movement of the upstream control component, the clutch brake grounded to the rotorcraft proximate the upstream control component, and increasing friction of a variable friction device on a downstream control component connecting the series actuator to the swashplate to substantially prevent movement of the downstream control component. Adjusting the differential friction across the series actuator to cause the series actuator to adjust the cockpit control component includes centering the series actuator to move the upstream control component and adjusting the cockpit control position to match the identified swashplate position. Adjusting the differential friction across the series actuator to cause the series actuator to adjust the cockpit control component includes intermittently decreasing friction of the variable friction device on the downstream control component to allow movement of the downstream control component. The method includes engaging the clutch brake on the upstream control component to substantially prevent movement of the upstream control component while decreasing friction of the variable friction device on the downstream control component. The flight mode of the rotorcraft is a hover mode, and the adjusted cockpit control position of the cockpit control component is a centered position.

Certain aspects encompass a method for controlling rotorcraft flight, including adjusting a differential friction between an upstream linkage and a downstream linkage relative to a series actuator to allow movement of the upstream linkage and prevent movement of the downstream linkage, and controlling actuation of the series actuator in response to the adjusted differential friction between the upstream linkage and the downstream linkage.

The aspects above can include some, none, or all of the following features. Adjusting a differential friction between an upstream linkage and a downstream linkage relative to a series actuator includes applying a first, higher friction on the downstream linkage than a second, lower friction on the upstream linkage. Controlling actuation of the series actuator in response to the adjusted differential friction between the upstream linkage and the downstream linkage includes centering the series actuator and moving the upstream linkage to position a cockpit control stick connected to the upstream linkage. The method includes determining a cockpit control stick position corresponding to a swashplate position in a flight mode of the rotorcraft, the downstream linkage connected to the swashplate, and positioning the cockpit control stick in the determined cockpit control stick position.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
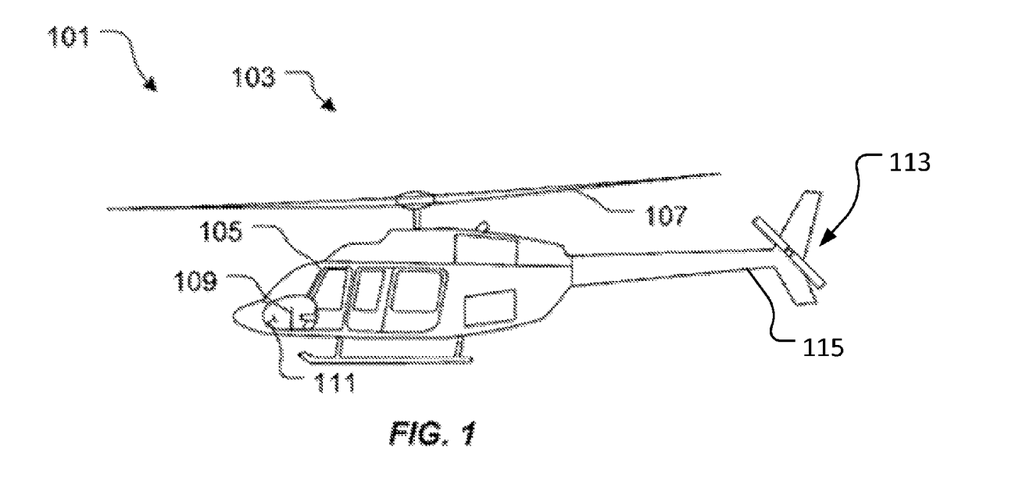
FIG. 1 is a schematic side view of an example helicopter.
Figure 2:
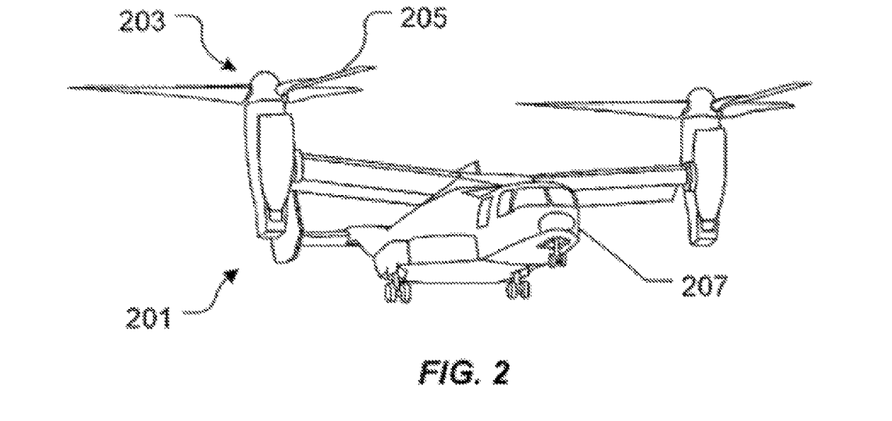
FIG. 2 is a schematic side view of an example tiltrotor aircraft.

This disclosure describes aircraft or rotorcraft flight control with an autopilot system, for example, including a differential friction system that allows trimming operations to be performed with a series actuator of the autopilot system. In some implementations, the autopilot system includes only one actuator type, the series actuator, and corresponding drive electronics for the series actuator for all control motion of the aircraft or rotorcraft, while allowing for hands-on augmentation of rotorcraft stability. In certain implementations, the autopilot system automatically re-trims cockpit controls when required using only the series actuator, while providing full stabilization and automation capability. FIGS. 1 and 2 show an example helicopter 101 and an example tiltrotor aircraft 201, respectively, that can each utilize an autopilot system including a differential friction system. However, this disclosure is applicable to any aircraft that uses boosted controls (i.e., force amplification between a pilot and control surfaces or swashplate) and series actuation. In conventional autopilot systems, series actuators provide hands-on stabilization and higher-frequency control inputs, and supply changes to control surfaces such as a swashplate of a rotorcraft without moving cockpit controls. Additionally, in conventional autopilot systems, parallel actuators provide hands-off flight control and lower frequency inputs to position cockpit controls.

FIGS. 1 and 2 are schematic diagrams of two different rotorcrafts. FIG. 1 is a side view of the example helicopter 101, while FIG. 2 is an oblique view of the example tiltrotor aircraft 201. Helicopter 101 includes a rotary system 103 carried by a fuselage 105. Rotor blades 107 connected to the rotary system 103 provide flight for helicopter 101. The rotor blades 107 are controlled by multiple controllers within fuselage 105. The pitch of each rotor blade 107 can be manipulated to selectively control direction, thrust, and lift of the helicopter 101. For example, during flight a pilot can manipulate the cyclic controller 109 for changing the pitch angle of rotor blades 107 and/or manipulate pedals 111, thus providing vertical, horizontal, and yaw flight movement. Helicopter 101 can further include an anti-torque system 113 and an empennage 115.

Tiltrotor aircraft 201 includes two or more rotary systems 203 having multiple proprotors 205 and carried by rotatable nacelles. The rotatable nacelles provide means for allowing aircraft 201 to take-off and land like a conventional helicopter, and for horizontal flight like a conventional fixed wing aircraft. Like the helicopter 101, the tiltrotor aircraft 201 includes controls, e.g., cyclic controllers and pedals, carried within the cockpit of fuselage 207, for causing movement of the aircraft.

Figure 3:
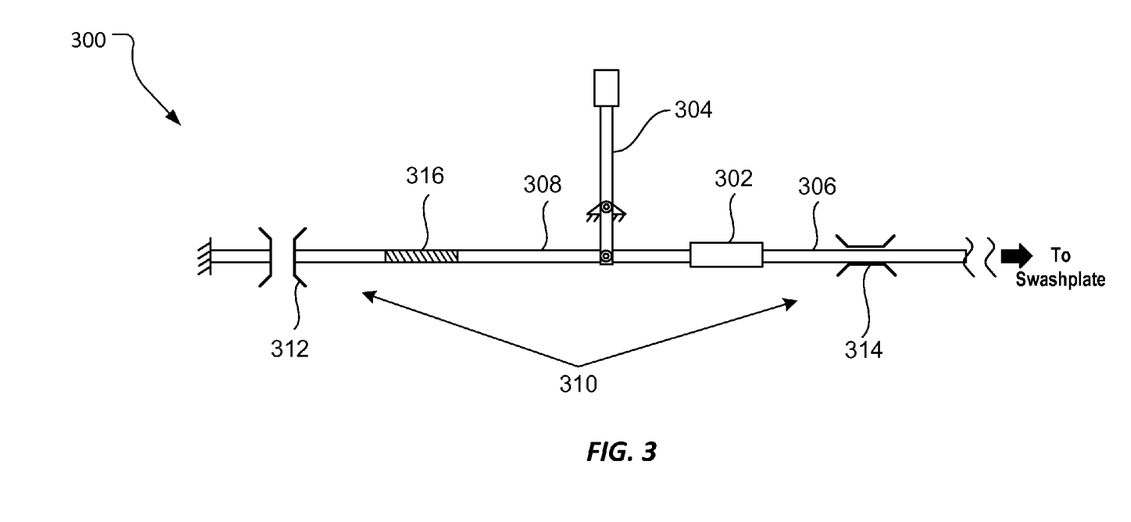
FIG. 3 is a schematic view of an example rotorcraft autopilot system.

FIG. 3 shows a schematic view of an example rotorcraft autopilot system 300. The example rotorcraft autopilot system 300 includes a series actuator 302 connecting a cockpit control component 304 (e.g., cyclic controller 109 and/or pedals 111 of FIG. 1) to a swashplate of a rotorcraft. In some implementations, the series actuator 302 connects the cockpit control component 304 to an anti-torque system of a rotorcraft. Under non-trimming conditions of the rotorcraft autopilot system 300, the series actuator 302 transmits a control input from the cockpit control component 304 to the swashplate through a downstream control component 306. The series actuator 302 modifies (e.g., dampens, delays, amplifies, stabilizes, and/or otherwise transmits) the control input from the cockpit control component 304 to the swashplate through a downstream control component 306. In some implementations, the series actuator 302 modifies the control input by adjusting a movement between an upstream control component 308 connected to the cockpit control component 304 and the downstream control component 306 to move the swashplate in response to the control input from the cockpit control component 304 and/or inputs from rotorcraft motion sensors. An example control input may include a hands-on input from a pilot of the rotorcraft to move the cockpit control component 304. In some instances, a control input on the cockpit control component 304 causes the swashplate to move via movement of the upstream control component 308 against the series actuator 302, and movement of the series actuator 302 against the downstream control component 306 directly or indirectly attached to the swashplate. For example, under non-trimming conditions of the rotorcraft autopilot system 300, the series actuator 302 connects the upstream control component 308 with the downstream control component 306 as a substantially rigid link, but may supply differential motions to the downstream control component 306 without moving the upstream control component 308. In some implementations, the series actuator 302 includes a control tube connecting the upstream control component 308 with the downstream control component 306. For example, the series actuator 302 moves the upstream control component 308 and/or the downstream control component 306 such that a gap between the upstream control component 308 and the downstream control component 306 within the control tube is centered in the control tube of the series actuator 302.

The example rotorcraft autopilot system 300 also includes a differential friction system 310 connected to the cockpit control component 304 to control the series actuator 302 to automatically adjust a position of the cockpit control component 304 during rotorcraft flight based, in part, on a flight mode of the rotorcraft. For example, a transition in flight mode between a hover mode to a cruise flight mode may require a change in cockpit control component 304 position. The differential friction system 310 of the example rotorcraft autopilot system 300 includes a clutch brake 312 grounded to the rotorcraft proximate the upstream control component 308 and a variable friction device 314 grounded to the rotorcraft proximate the downstream control component 306. The clutch brake 312 can engage or disengage the upstream control component 308, for example, to prevent movement of the upstream control component 308 or allow movement of the upstream control component 308, respectively. The clutch brake 312 can take many forms. For example, the clutch brake 312 can include a magnetic clutch brake, and/or another brake. The clutch brake 312 can engage the upstream control component 308 at a variety of positions of the upstream control component 308. For example, the clutch brake 312 can engage and prevent movement of the upstream control component 308 in the position depicted in FIG. 3, where the cockpit control component 304 is at a center position. In another example, the clutch brake 312 can engage and prevent movement of the upstream control component 308 in a different position than depicted in FIG. 3 after the upstream control component 308 is moved in response to a control input on the cockpit control component 304 and/or actuation of the series actuator 302. In certain implementations, the clutch brake 312 provides a frictional slippage between the upstream control component 308 and a rotorcraft structure.

The variable friction device 314 can selectively increase or decrease friction on the downstream control component 306, for example, to (substantially or wholly) prevent movement of the downstream control component 306 or substantially allow movement of the downstream control component 306, respectively. In some implementations, the variable friction device 314 can provide additional or different features. For example, the variable friction device 314 can apply a variable friction or a fixed friction on the downstream control component 306, or selectively not apply friction on the downstream control component 306. In certain implementations, the variable friction device 314 is excluded from the example rotorcraft autopilot system 300, and a fixed friction (e.g., natural friction) of the downstream control component 306 substantially prevents movement of the downstream control component 306, for example, while the clutch brake 312 is disengaged from the upstream control component 308. Alternatively, the fixed friction of the downstream control component 306 substantially allows movement of the downstream control component 306, for example, while the clutch brake 312 is engaged with the upstream control component 308. In some implementations, the fixed friction of the downstream control component 306 corresponds to downstream joint stiffness, a spring force at downstream joints, and/or other friction sources.

Figure 7:
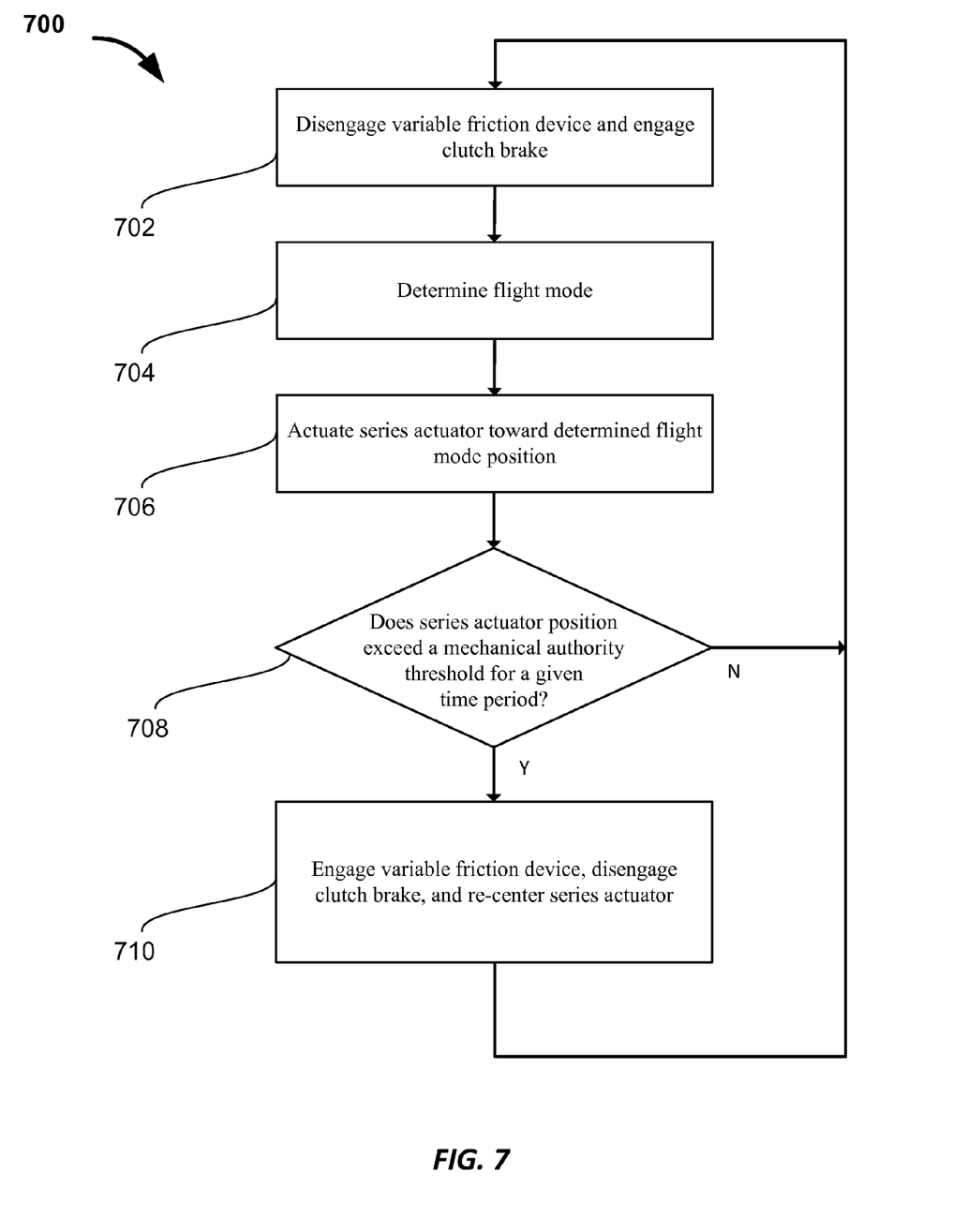

In some examples, the series actuator 302 may be limited in mechanical authority for fail safety reasons to 10% to 20% of full control authority. A transition in flight mode, for example, between a hover mode and a cruise flight mode, may require a change in cockpit control component 304 position by 50% or more. In some implementations, the differential friction system 310 allows automatic movement of the cockpit control component 304 as needed to keep the series actuator 302 operating within its mechanical authority limits by selectively switching between trimming and non-trimming conditions. For example, referring to FIG. 7, a flow chart describing an example process 700 performed by the differential friction system 310 of FIG. 3 is described. At 702, the variable friction device 314 is disengaged and the clutch brake 312 is engaged. At 704, a flight mode is determined. At 706, the series actuator 302 actuates toward a position corresponding to the determined flight mode. At 708, if a position of the series actuator 302 exceeds a mechanical authority threshold for a given time period, the variable friction device 314 engages, the clutch brake 312 disengages, and the series actuator 302 recenters.

Referring back to FIG. 3, in some implementations, the rotorcraft autopilot system 300 includes a centering spring 316, for example, a double acting spring cartridge, on the upstream control component 308 between the clutch brake 312 and the cockpit control component 304 to bias the cockpit control component 304 towards a neutral center position when the clutch brake 312 is engaged. The neutral center position of the cockpit control component 304 corresponds with the position of the upstream control component 308 when the clutch brake 312 is engaged. Although FIG. 3 shows the neutral center position of the cockpit control component 304 as substantially vertical, a neutral center position of the cockpit control component 304 can be offset from the vertical. In some implementations, under non-trimming conditions (e.g., when the clutch brake 312 is engaged), the centering spring 316 provides a force-feel for a pilot applying force on the cockpit control component 304 due to compression or extension of the centering spring 316. In some implementations, the downstream control component 306 and the upstream control component 308 include a downstream control linkage and an upstream control linkage, respectively. The upstream control component 308 can include a joint in the upstream linkage that pivotally connects to the cockpit control component 304. Although FIG. 3 shows the joint as a pivot joint, the rotorcraft autopilot system 300 can be implemented in more than one spatial axis, for example, where the joint is a universal joint to effect multi-axis movement. The example upstream control component 308 of FIG. 3 shows one upstream linkage extending from the series actuator 302 to the clutch brake 312 with a joint connecting to the cockpit control component 304. However, in some implementations, the upstream control component 308 includes more than one upstream linkage. The example downstream control component 306 of FIG. 3 shows one downstream linkage extending from the series actuator 302 toward the swashplate. However, the downstream control component 306 can include more than one downstream linkage that can connect directly or indirectly to the swashplate of the rotorcraft.

In some implementations, a rotorcraft with the example autopilot system 300 trims the cockpit control component 304 to match a swashplate position for a specified flight mode of the rotorcraft. The specified flight mode can include hover mode, takeoff, climbout, cruise, turning, descent, approach, a combination of this list, and/or another rotorcraft flight mode. The series actuator 302 effects movement of the swashplate and/or the cockpit control component 304 based on a differential friction across the series actuator 302. In other words, actuation of the series actuator 302 moves the cockpit control component 304 at a first differential friction, and moves the swashplate at a second differential friction across the series actuator 302. In some instances, the differential friction system 310 adjusts the differential friction across the series actuator 302. For example, disengaging the clutch brake 312 on the upstream control component 308 allows movement of the upstream control component 308. In some examples, increasing friction on the downstream control component 306 by the variable friction device 314 (substantially or wholly) prevents movement of the downstream control component 306. Thus, actuation (e.g., internal centering) of the series actuator 302 moves the upstream control component 306, and therefore moves the cockpit control component 304, for example, to a cockpit control position corresponding to the swashplate position for the specified flight mode of the rotorcraft. Disengaging the clutch brake 312 and increasing friction of the variable friction device 314 creates the first differential friction across the series actuator 302. In certain instances, the variable friction device 314 intermittently decreases friction on the downstream control component 306 to allow movement of the downstream control component 306, and the clutch brake engages to prevent movement of the upstream control component 308 to allow the series actuator 302 to move the swashplate, for example, when a pilot provides intermittent hands-on control of the cockpit control component 304. Engaging the clutch brake 312 and decreasing friction of the variable friction device 314 creates the second differential friction across the series actuator 302.

In some implementations, the differential friction across the series actuator 302 is defined by a friction applied on the upstream control component 308 compared to a friction applied on the downstream control component 306. In other words, a higher friction on the upstream component 308 than a lower friction on the downstream component 306 allows the series actuator 302 to (substantially or wholly) move the downstream component 306 without (substantially or wholly) moving the upstream component 308. For example, when the clutch brake 312 is engaged, the series actuator 302 actuates to move the downstream control component 306, and subsequently move the swashplate, while the upstream component 308 does not move. Alternatively, a higher friction on the downstream component 306 than a lower friction on the upstream component 308 allows the series actuator 302 to (substantially or wholly) move the upstream component 308 without (substantially or wholly) moving the downstream component 306. For example, when the clutch brake 312 is disengaged, the series actuator 302 actuates to move the upstream control component 308, and subsequently move the cockpit control component 304, while the downstream control component 306 does not move due to a fixed friction in the downstream component 306 being greater than that of the upstream component 308 and/or due to the variable friction device 314 applying a higher friction on the downstream control component 306 than that of the upstream control component 308.

Figure 4:
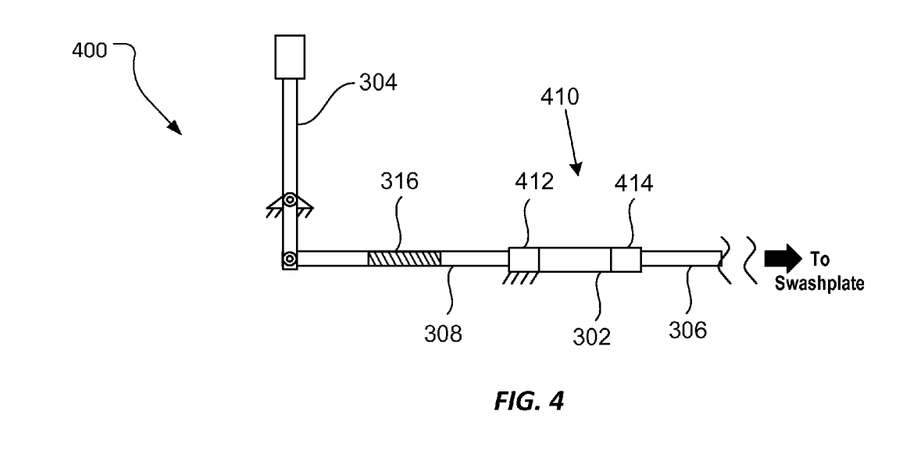
FIG. 4 is a schematic view of an example rotorcraft autopilot system.

A rotorcraft autopilot system can take many forms, and can be implemented in a manner different than the rotorcraft autopilot system 300 of FIG. 3. For example, FIG. 4 shows an example rotorcraft autopilot system 400 that is like the rotorcraft autopilot system 300 of FIG. 3, except the differential friction system 410 is implemented differently, including the clutch brake 412 and the variable friction device 414. In the example rotorcraft autopilot system 400 of FIG. 4, the clutch brake 412, series actuator 302, and variable friction device 414 are adjacent each other, with the clutch brake 412 connected to the upstream control component 308 proximate an upstream end of the series actuator 302 and the variable friction device 414 connected to the downstream control component 306 proximate a downstream end of the series actuator 302. The clutch brake 412 can selectively ground to the rotorcraft to prevent movement of the upstream control component 308, while allowing the series actuator 302 to actuate and move the downstream control component 306. The variable friction device 414 can selectively ground to the rotorcraft to prevent movement of the downstream control component 306, while allowing the series actuator 302 to actuate and move the upstream control component 308. In certain implementations, the clutch brake 412, series actuator 302, and variable friction device 414 can comprise a single variable actuator assembly that connects on one end to the upstream control component 308 and on another end to the downstream control component 306, where the clutch brake 412 and the variable friction device 414 can selectively ground to the rotorcraft and prevent movement of the upstream control component 308 and the downstream control component 306, respectively. For example, under non-trimming conditions, the clutch brake 412 is engaged with the upstream control component 308 and grounded to the rotorcraft to prevent movement of the upstream control component 308, while allowing the series actuator 302 to actuate the downstream control component 306 as needed.

In some implementations, the autopilot system includes a controller to control operations of the series actuator, clutch brake, variable friction device, and/or other components of the autopilot system. The controller can be implemented as processing circuitry (e.g., hardware, firmware, and/or other) that may or may not connect to other processing circuitry of the rotorcraft.

Figure 5:
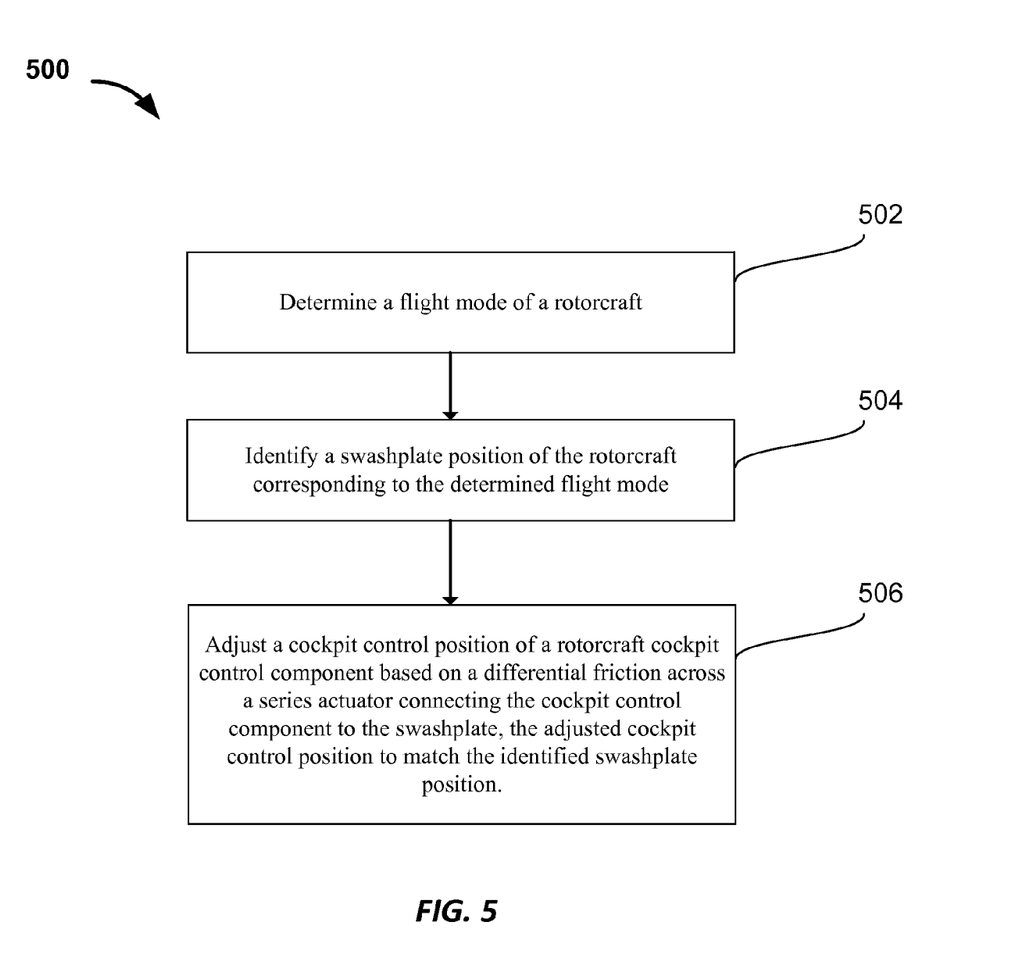
FIGS. 5, 6, and 7 are flowcharts describing example processes for controlling rotorcraft flight.
Like reference numbers and designations in the various drawings indicate like elements.

FIG. 5 is a flow chart describing a method 500 for controlling rotorcraft flight, for example, performed by the example rotorcraft autopilot system 300 or 400. At 502, a flight mode of a rotorcraft is determined. At 504, a swashplate position of the rotorcraft corresponding to the determined flight mode is identified. At 506, a cockpit control position of a rotorcraft cockpit control component is adjusted based on a differential friction across a series actuator connecting the cockpit control component to the swashplate. The adjusted cockpit control position matches the identified swashplate position.

Figure 6:
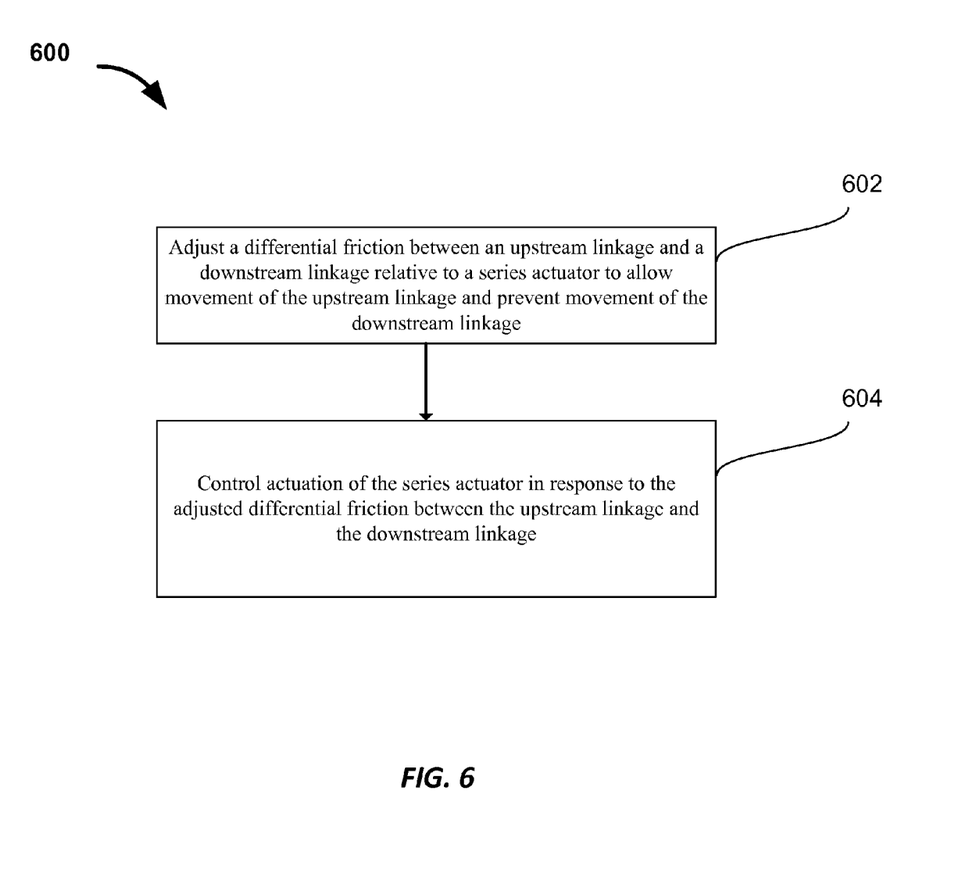

FIG. 6 is a flow chart describing another method 600 for controlling rotorcraft flight, for example, performed by the example rotorcraft autopilot system 300 or 400. At 602, a differential friction between an upstream linkage and a downstream linkage relative to a series actuator is adjusted to allow movement of the upstream linkage and prevent movement of the downstream linkage. At 604, actuation of the series actuator is controlled in response to the adjusted differential friction between the upstream linkage and the downstream linkage.

A number of implementations have been described. Nevertheless, it will be understood that various modifications may be made without departing from the spirit and scope of the disclosure.

What is claimed is:

1. A rotorcraft autopilot system, comprising:
   a series actuator connecting a cockpit control component to a swashplate of a rotorcraft, the series actuator to modify a control input from the cockpit control component to the swashplate through a downstream control component;
   a differential friction system connected to the cockpit control component and the downstream control component, the differential friction system comprising a variable friction device grounded to the rotorcraft proximate the downstream control component, the variable friction device configured to increase or decrease a friction on the downstream control component; and
   wherein the differential friction system is configured to selectively apply the friction on the downstream component to control the series actuator to automatically adjust a position of the cockpit control component during rotorcraft flight based, in part, on a flight mode of the rotorcraft.

2. The rotorcraft autopilot system of claim 1, wherein the series actuator modifies the control input by adjusting a movement between an upstream control component connected to the cockpit control component and the downstream control component to move the swashplate in response to the control input from the cockpit control component.

3. The rotorcraft autopilot system of claim 2, wherein the upstream control component and the downstream control component comprise an upstream control linkage and a downstream control linkage, respectively.

4. The rotorcraft autopilot system of claim 2, wherein the differential friction system comprises a clutch brake grounded to the rotorcraft proximate the upstream control component, the clutch brake to engage or disengage the upstream control component.

5. The rotorcraft autopilot system of claim 4, wherein the clutch brake is a magnetic clutch brake.

6. The rotorcraft autopilot system of claim 4, wherein, when the clutch brake is disengaged, a fixed friction of the downstream control component substantially prevents the downstream control component from movement.

7. The rotorcraft autopilot system of claim 4, further comprising a centering spring on the upstream control component between the clutch brake and the cockpit control component, the centering spring to bias the cockpit control component toward a neutral center position when the clutch brake is engaged.

8. A method, comprising:
determining a flight mode of a rotorcraft;
identifying a swashplate position of the rotorcraft corresponding to the determined flight mode; and
applying a friction on a downstream control component connecting a series actuator to the swashplate to substantially prevent a movement of the downstream control component such that a cockpit control position of a rotorcraft cockpit control component connected to the series actuator by an upstream control component is adjusted by a differential friction across the series actuator.

9. The method of claim 8, further comprising adjusting the differential friction across the series actuator to cause the series actuator to adjust the cockpit control component or the swashplate.

10. The method of claim 9, wherein adjusting the differential friction across the series actuator to cause the series actuator to adjust the cockpit control component comprises:
disengaging a clutch brake on the upstream control component to allow movement of the upstream control component, wherein the clutch brake grounded is to the rotorcraft proximate the upstream control component; and
increasing the friction of a variable friction device on the downstream control component connecting the series actuator to the swashplate to substantially prevent movement of the downstream control component.

11. The method of claim 10, wherein adjusting the differential friction across the series actuator to cause the series actuator to adjust the cockpit control component further comprises:
centering the series actuator to move the upstream control component; and
adjusting the cockpit control position to match the identified swashplate position.

12. The method of claim 10, wherein adjusting the differential friction across the series actuator to cause the series actuator to adjust the cockpit control component comprises intermittently decreasing friction of the variable friction device on the downstream control component to allow movement of the downstream control component.

13. The method of claim 12, further comprising engaging the clutch brake on the upstream control component to substantially prevent movement of the upstream control component while decreasing friction of the variable friction device on the downstream control component.

14. The method of claim 8, wherein the flight mode of the rotorcraft is a hover mode; and
wherein the adjusted cockpit control position of the cockpit control component is a centered position.

15. A method for controlling rotorcraft flight, the method comprising:
providing a variable friction device connected to a downstream linkage, a series actuator connected to the variable friction device, and an upstream linkage connected to the series actuator;
adjusting a differential friction between the upstream linkage and the downstream linkage relative to the series actuator using the variable friction device to allow movement of the upstream linkage and prevent movement of the downstream linkage; and
controlling actuation of the series actuator in response to the adjusted differential friction between the upstream linkage and the downstream linkage.

16. The method of claim 15, wherein adjusting the differential friction between the upstream linkage and the downstream linkage relative to a series actuator comprises applying a first, higher friction on the downstream linkage than a second, lower friction on the upstream linkage.

17. The method of claim 15, wherein controlling actuation of the series actuator in response to the adjusted differential friction between the upstream linkage and the downstream linkage comprises:
centering the series actuator; and
moving the upstream linkage to position a cockpit control stick connected to the upstream linkage.

18. The method of claim 17, further comprising:
determining a cockpit control stick position corresponding to a swashplate position in a flight mode of the rotorcraft, the downstream linkage connected to the swashplate; and
positioning the cockpit control stick in the determined cockpit control stick position.

* * * * *